R. W. DAVIS.
CROSS HEAD.
APPLICATION FILED JULY 1, 1914.

1,128,109.

Patented Feb. 9, 1915.
2 SHEETS—SHEET 1.

Witnesses
C. F. Rudolph
John J. McCarthy

Inventor
Ray W. Davis,
By Victor J. Evans
Attorney

R. W. DAVIS.
CROSS HEAD.
APPLICATION FILED JULY 1, 1914.

1,128,109.

Patented Feb. 9, 1915.
2 SHEETS—SHEET 2.

Witnesses
C. F. Rudolph
John J. McCarthy

Inventor
Ray W. Davis,
By Victor J. Evans
Attorney

UNITED STATES PATENT OFFICE.

RAY W. DAVIS, OF BROWNSVILLE, PENNSYLVANIA, ASSIGNOR OF ONE-HALF TO WALTER B. CHALFANT, OF BROWNSVILLE, PENNSYLVANIA.

CROSS-HEAD.

1,128,109.  Specification of Letters Patent.  Patented Feb. 9, 1915.

Application filed July 1, 1914. Serial No. 848,424.

*To all whom it may concern:*

Be it known that I, RAY W. DAVIS, a citizen of the United States, residing at Brownsville, in the county of Fayette and State of Pennsylvania, have invented new and useful Improvements in Cross-Heads, of which the following is a specification.

This invention relates to improvements in cross heads for steam engines and the like.

In carrying out the present invention, it is my purpose to provide a cross head whereby friction between the same and the guide rods will be reduced to a minimum and wherein the gibs contacting with the guides may be lubricated thoroughly.

It is also my purpose to provide a cross head wherein the gibs on the opposite side edges of the cross head will be in the form of sections so that wear on the gibs and cross head will be minimized and wherein the component parts may be readily assembled and disassembled when necessary.

With the above and other objects in view, the invention consists in the construction, combination and arrangement of parts hereinafter set forth in and falling within the scope of the claim.

Figure 4:
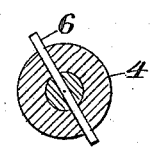
Figure 3:
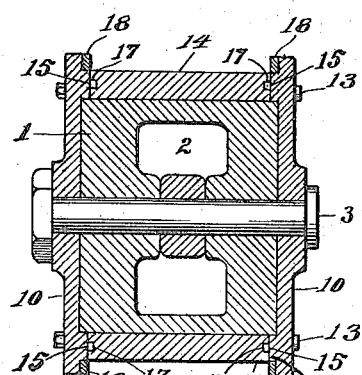
Figure 2:
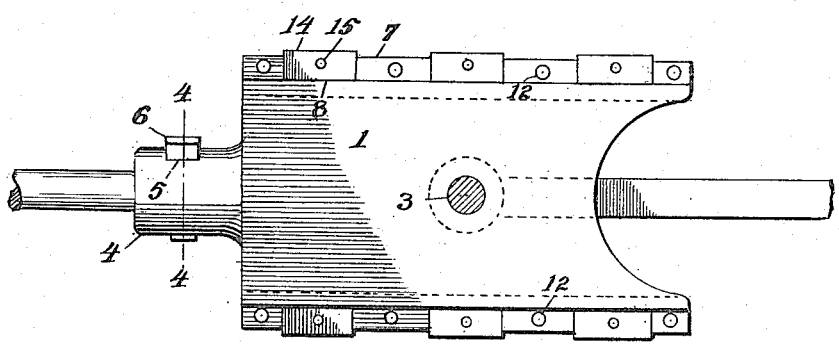
Figure 1:
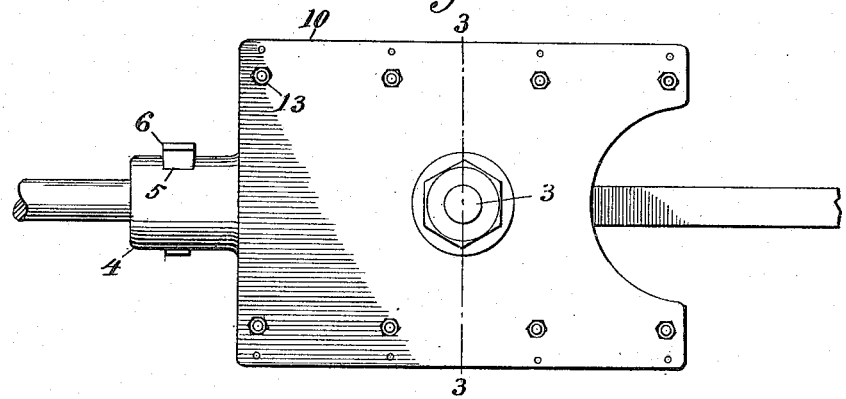
Figure 5:
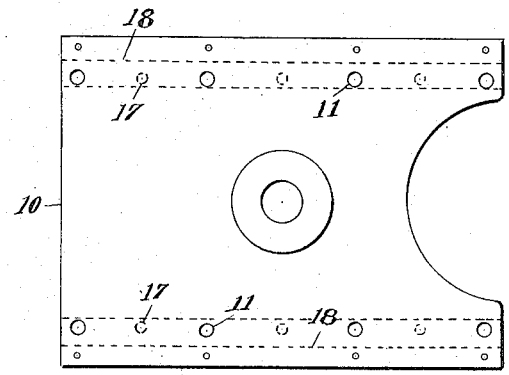
Figure 7:
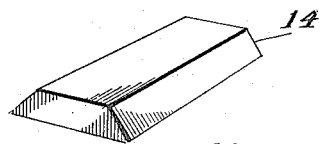
Figure 6:
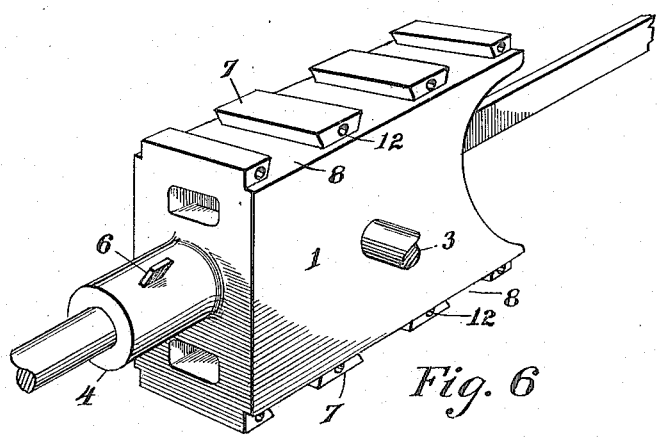

In the accompanying drawings; Figure 1 is a view in side elevation of a cross head constructed in accordance with the present invention. Fig. 2 is a similar view with the side plates removed. Fig. 3 is a cross sectional view through the cross head on the line 3—3 of Fig. 2. Fig. 4 is a similar view on the line 4—4 of Fig. 2. Fig. 5 is a view in side elevation of one of the side plates. Fig. 6 is a perspective view of a modified form of cross head, the side plates being removed. Fig. 7 is a perspective view of one of the gibs.

Referring now to the drawings in detail, 1 designates the body portion of the cross head having a recess 2 formed in one end thereof to receive the adjacent extremity of the pitman or connecting rod and formed in the opposite faces of the body, such faces forming the side walls of the recess 2, are alining openings through which a wrist pin 3 is passed to effect a connection between the cross head and the pitman. Formed integral with the opposite end of the body portion 1 and extending outwardly therefrom coaxial with the recess 2 is a sleeve 4 adapted to receive the outer end of the piston rod and provided at diametrically opposite points with alining slots 5 adapted to register with a slot formed in the adjacent extremity of the rod of the piston to receive a wedge key 6 whereby the cross head is locked to the piston rod so that movement will be transmitted from the piston through the connecting rod to the crank shaft or drive shaft. Formed in the opposite side edges of the body, that is, the top and bottom edges, transversely thereof are lugs 7 spaced apart equal distances to form ways 8 and having the opposite extremities thereof terminating inwardly of the faces of the body 1.

Disposed upon opposite sides of the body 1 are side plates 10 formed with bolt holes 11 disposed adjacent to the opposite longitudinal edges thereof and alining with similar holes 12 formed in the lug to receive bolts or studs 13 whereby the side plates are fastened to the body and held in proper position. The inner surfaces of the side plates are formed with longitudinally extending ribs 9 disposed adjacent to the longitudinal edges thereof and abutting the adjacent ends of the lugs 7 to close the ends of the ways 8.

Gib strips 14 are set into the ways 8 and the opposite ends thereof are formed with recesses 15 into which seat pins 17 carried by the inner faces of the side plates, the pins 17 within the recesses 15 acting to prevent displacement of the gibs. These gibs are relatively thick as compared with the depth of the ways 8 so that the outer surfaces thereof terminate beyond the lugs 7 and engage the guides of the cross head. These gib sections being spaced apart owing to the lugs 7 between the same engage the guides at different points so that friction between the cross head and the guides is reduced to a minimum and the gibs capable of being lubricated thoroughly. If desired, the opposite side edges of the lugs 7 may be under-cut as shown in Fig. 6 so that the ways 8 will be dovetailed in cross section, and the gibs similarly formed cross sectionally, as shown in Fig. 7, to fit into the ways. When the ways and gibs are formed as illustrated in Fig. 7, the pins 17 and apertures or openings 15 in the gibs are eliminated, as the gibs, being dovetailed within the ways, are held against outward movement. The outer edges of the side plates 10 project beyond the gibs and the confronting faces of coacting plates adjacent to the outer edges thereof are equipped with liners 18 bearing against the adjacent sides of the guides so as to reduce friction between the inner faces of the side plates and the guides.

From the foregoing description taken in connection with the accompanying drawings, the construction, mode of operation and manner of employing my improved cross head will be readily apparent. It will be seen that I have provided a cross head wherein the gibs at the top and bottom edges of the body of the cross head are, in effect, sectioned and the confronting edges of the sections spaced apart so that the amount of surface in contact with the guides is relatively small, thereby minimizing friction and facilitating lubrication. Furthermore, it will be seen that any gib section may be removed independently of the remaining sections for cleaning or replacing.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A cross head comprising a body having a recess formed in one end thereof to receive the adjacent extremity of the pitman, a sleeve formed on the opposite end of said body coaxial with the recess therein to receive the outer end of the piston rod, lugs on the opposite side edges of said body transversely thereof and spaced apart to form ways and terminating inwardly of the sides of the body, side plates secured to the sides of said body and extending outwardly beyond the lugs, ribs on the inner surfaces of said plates adjacent to the longitudinal edges thereof respectively and abutting the ends of said ribs to close the ends of the ways, gibs in said ways, and liners carried by the confronting faces of the side plates beyond said lugs.

In testimony whereof I affix my signature in presence of two witnesses.

RAY W. DAVIS.

Witnesses:
E. E. HARRISON,
H. B. STAPLETON.